(12) United States Patent
Oliver

(10) Patent No.: US 11,013,188 B2
(45) Date of Patent: May 25, 2021

(54) STACKABLE GROW POT SYSTEM

(71) Applicant: Joel Oliver, York (CA)

(72) Inventor: Joel Oliver, York (CA)

( * ) Notice: Subject to any disclaimer, the term of this patent is extended or adjusted under 35 U.S.C. 154(b) by 271 days.

(21) Appl. No.: 16/007,881

(22) Filed: Jun. 13, 2018

(65) Prior Publication Data

US 2019/0380281 A1 Dec. 19, 2019

(51) Int. Cl.
*A01G 9/02* (2018.01)
*A01G 9/04* (2006.01)

(52) U.S. Cl.
CPC ............... *A01G 9/042* (2013.01); *A01G 9/02* (2013.01)

(58) Field of Classification Search
CPC ................................ A01G 9/026; A01G 9/042
USPC .......................................................... 47/66.1
See application file for complete search history.

(56) References Cited

U.S. PATENT DOCUMENTS

| | | | | |
|---|---|---|---|---|
| 4,457,104 A * | 7/1984 | Hefner | ................... | A01G 9/029 47/73 |
| 6,134,832 A * | 10/2000 | Bokmiller | .............. | A01G 9/021 206/509 |
| 6,427,379 B1 * | 8/2002 | Lehner | ..................... | A01G 9/02 47/66.1 |
| 6,637,156 B2 * | 10/2003 | Stewart | .................. | A01G 27/04 220/8 |
| 2004/0144027 A1 | 7/2004 | Dines | | |
| 2005/0166455 A1 * | 8/2005 | Nishida | .................... | A01G 9/02 47/79 |
| 2009/0056215 A1 * | 3/2009 | Yang | ...................... | A01G 9/028 47/66.1 |
| 2012/0000127 A1 * | 1/2012 | Liu | .......................... | A01G 9/02 47/66.1 |
| 2016/0050855 A1 * | 2/2016 | Munt, III | ............... | A01G 9/026 47/66.1 |

FOREIGN PATENT DOCUMENTS

GB 2477216 A * 7/2011 ............... A01G 9/02

* cited by examiner

*Primary Examiner* — Claude J Brown
(74) *Attorney, Agent, or Firm* — Runyan Law; Charles Runyan

(57) ABSTRACT

A stackable grow pot system including a plant pot having an inner volume, a plurality of side-walls, and a base including a selectively removeable disc. The selectively removeable disc is configured to be removed to allow plant roots to extend through an aperture. The plant pot is stackable. When stacked, the plant pot provides for volume expansion for growth of a plant and the plant roots through the aperture into a second-plant-pot. The device allows for quick and efficient transplanting.

18 Claims, 5 Drawing Sheets

STACKABLE GROW POT SYSTEM

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of plant husbandry and more specifically relates to a plant pot.

2. Description of Related Art

Generally landscaping plants are initially grown in pots of small dimensions, where they are kept until they reach a certain growth, then being necessary to transplant them to other pots larger or land flowerbeds or gardens, all in order to allow to continue the growth of both the outside and the roots of the plant. With traditional pots, constituted by a container of small dimensions and equipped with hole or drainage openings, when the plant acquires a certain growth and to be transplanted, is necessary to remove the plant from the pot, operation always causes some deterioration in plant, mainly from its roots, and in some cases also requires the destruction of the pot. A suitable and more effective solution is desired.

U.S. Pub. No. 2004/0144027 to Charles Dines relates to a plant starter pot with removable base. The described plant starter pot with removable base includes a plant starter pot having a main body, a base member, and connection means that allows for selective connection of the base member to the main body and selective removal from the main body. A base-removing tool is provided to facilitate removal of the base member from the main body when a plant is suitably mature.

BRIEF SUMMARY OF THE INVENTION

In view of the foregoing disadvantages inherent in the known plant husbandry art, the present disclosure provides a novel stackable grow pot system. The general purpose of the present disclosure, which will be described subsequently in greater detail, is to provide a plant pot structured to allow for transplanting of the plant growing within the plant pot without root damage.

A stackable grow pot system is disclosed herein. The stackable grow pot system includes a plant pot having an inner volume, at least one or a plurality of side-walls, and a base including a selectively removeable disc. The plant pot is defined by the inner volume, the base, and the side-wall (s). The selectively removeable disc is configured to be removed to allow plant roots to extend through an aperture. The plant pot further comprises a pull tab plastic seal configured to be removed and expose the plant roots. The plant pot is stackable. When stacked, the plant pot provides for volume expansion for growth of a plant and the plant roots. When the selectively removeable disc is removed, plant roots can extend from a first-plant-pot to a second-plant-pot. The second-plant-pot is a soil filled the plant pot configured to provide additional growth space from the plant growing within the plant pot. The plant pot may be provided in a plurality of sizes/volumes to accommodate a relative size of the plant growing within.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a stackable grow pot system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to plant husbandry and more particularly to a stackable grow pot system as used to improve the continued growth of plants.

Generally, the stackable grow pot system is a plant pot having a removable bottom to allow for quick, clean and plant safe transplanting. By simply stacking the plant on top of another soil filled container of the same size it instantly doubles the space that was previously available for root growth. This process causes zero stress on the plant compared to the common method of transplanting from one size pot to a larger one. With the rapid stack there is no mess and no dirty hands. The stackable grow pot system becomes an easy tool to help make transplanting from one size pot to another and easy, mess free, and non-root damaging. The stackable grow pot system provides a way to transplant in seconds. The stackable grow pot system may be provided in various size pots.

The pot has a pull removable plastic seal that keeps the bottom disc attached until removed. When removed the base of the pot is discarded to be recycled and the pot is intact otherwise with exposed roots now visible. The pot can now be placed on a soil ready pot of same size or larger proportion for a quick volume expansion of growth media for the plant that has out grown the current container. The device may be reused if the bottom isn't fully removed.

Figure 1:
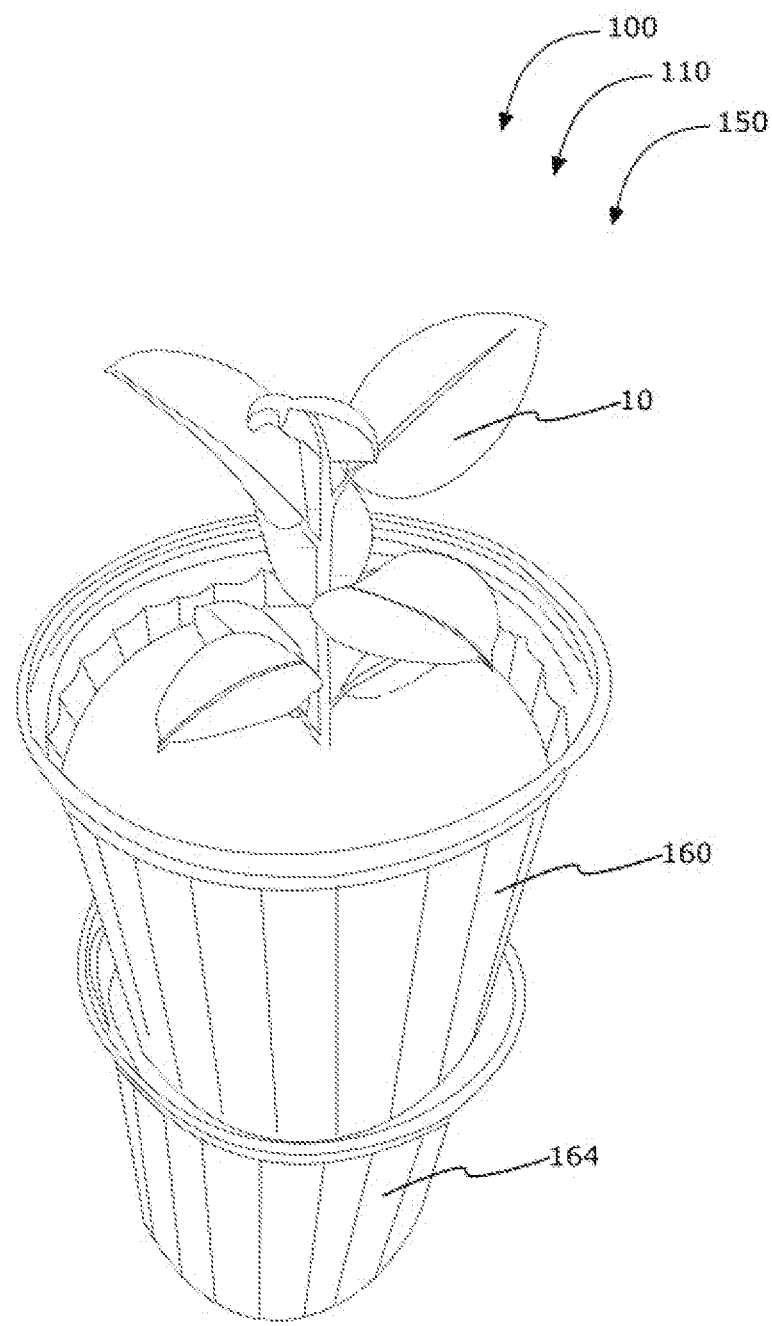
FIG. 1 is a perspective view of the stackable grow pot system during an 'in-use' condition, according to an embodiment of the disclosure.

Referring now more specifically to the drawings by numerals of reference, there is shown in FIGS. 1-5, various views of a stackable grow pot system 100. FIG. 1 shows a stackable grow pot system 100 during an 'in-use' condition 150, according to an embodiment of the present disclosure. As illustrated, the stackable grow pot system 100 may include a plant pot 110 having an inner volume 120, a plurality of side-walls 124, and a base 128 including a selectively removeable disc 140. The plant pot 110 is defined by the inner volume 120, the base 128, and the plurality of side-walls 124. Certain embodiments may only have one side-wall 124. The selectively removeable disc 140 is configured to be removed to allow plant roots 5 to extend through an aperture 142. The plant pot 110 is stackable. When stacked, the plant pot 110 provides for volume expansion for growth of a plant 10 and the plant roots 5.

Figure 2:
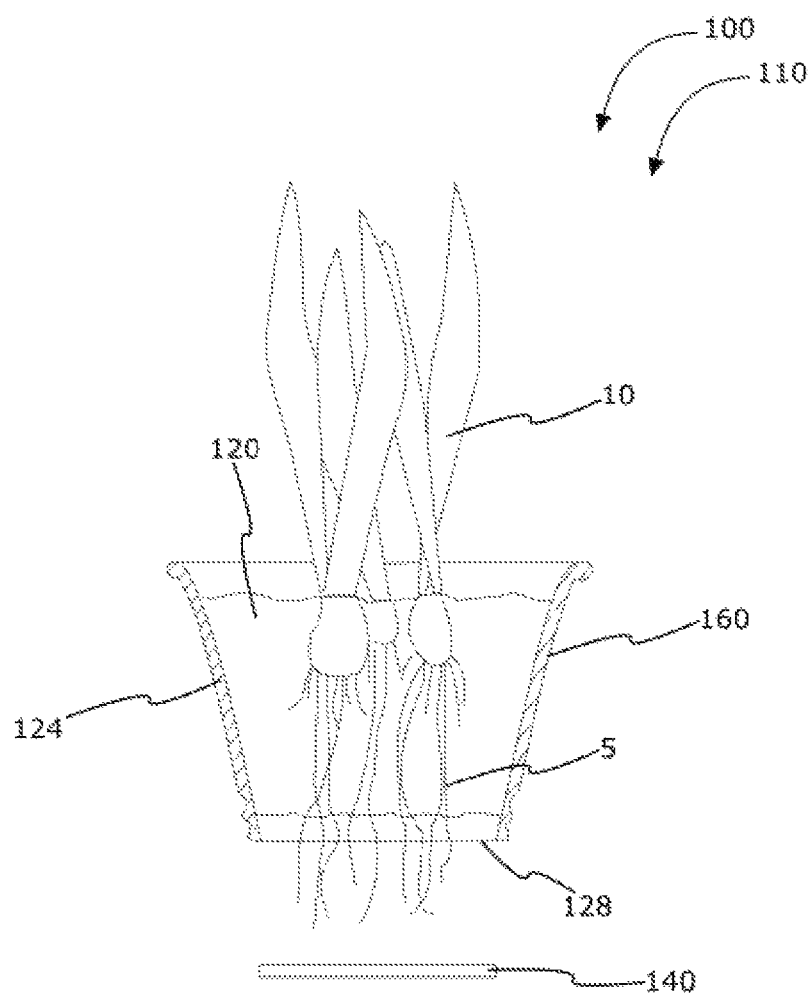
FIG. 2 is a side view of the stackable grow pot system of FIG. 1, according to an embodiment of the present disclosure.
Figure 2:
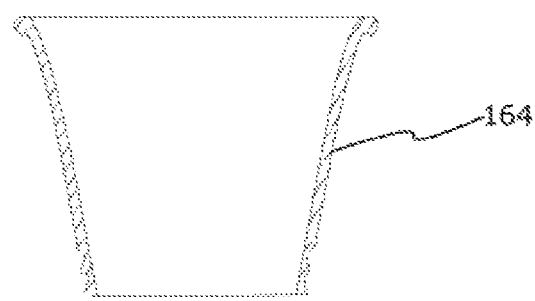

FIG. 2 shows a side view of the stackable grow pot system 100 of FIG. 1, according to an embodiment of the present disclosure. As above, the stackable grow pot system 100 may include the plant pot 110 having the selectively removeable disc 140 located on the base 128 of the plant pot 110. When the selectively removeable disc 140 is removed, plant roots 5 can extend from a first-plant-pot 160 to a second-plant-pot 164. The second-plant-pot 164 is a soil filled plant pot 110 configured to provide additional growth space from the plant 10 growing within the plant pot 110. The second-plant-pot 164 is a transplant-receiving-pot. The first-plant-pot 160 and the second-plant-pot 164 each comprise a top-diameter which is greater than a base-diameter of the base 128 allowing the first-plant-pot 160 to be stacked on the second-plant-pot 164. The plant pot 110 is structured to allow for 'transplanting' of the plant 10 growing within the plant pot 110 (provided) without root damage.

Figure 3:
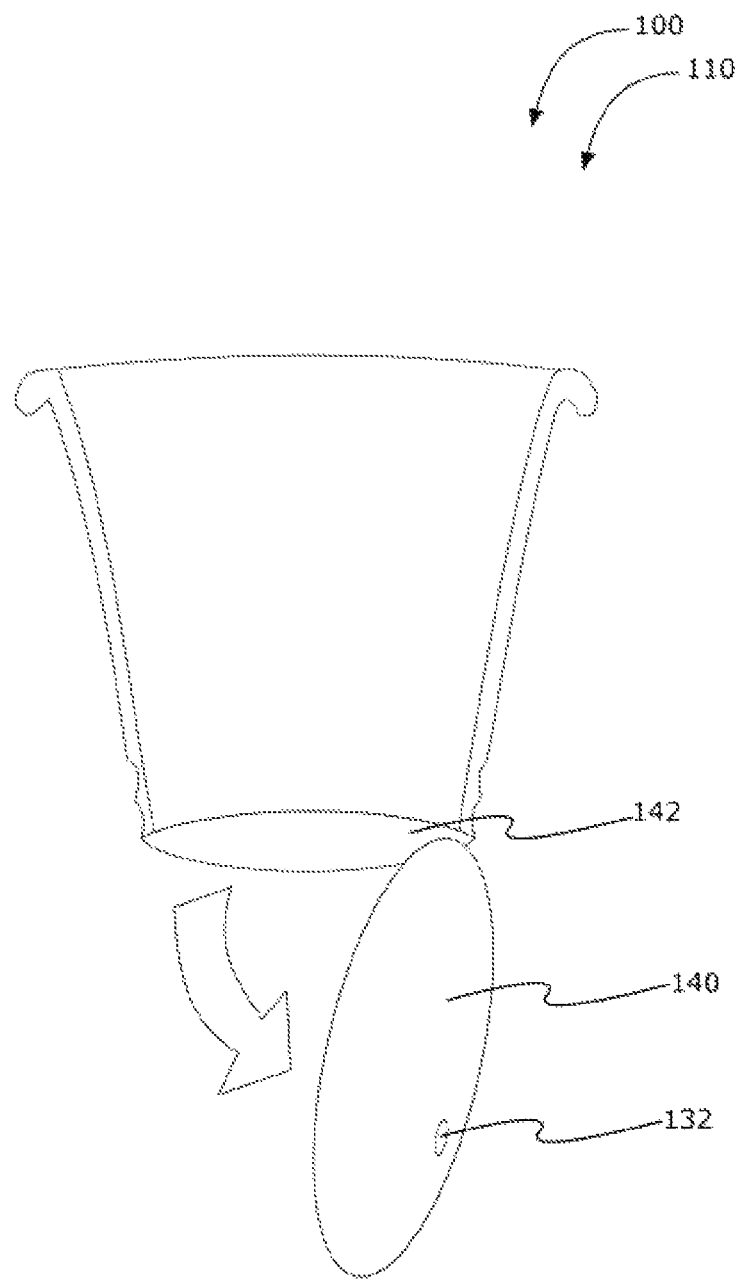
FIG. 3 is a bottom view of the stackable grow pot system of FIG. 1, according to an embodiment of the present disclosure.

FIG. 3 shows a bottom perspective view of the stackable grow pot system 100 of FIG. 1, according to an embodiment of the present disclosure. As above, the stackable grow pot system 100 may include the plant pot 110 having the inner volume 120, the plurality of side-walls 124, and the base 128 including the selectively removeable disc 140 comprising drainage hole 132. The plant pot 110 further comprises a pull tab plastic seal configured to be removed allowing for the removal of the selectively removeable disc 140 to expose the plant roots 5. When the pull tab plastic seal is engaged, the selectively removeable disc 140 is in a closed position sealing the base 128 of the plant pot 110. When the pull tab plastic seal is removed, the selectively removeable disc 140 is in an open position exposing the plant roots 5 through the aperture. The selectively removeable disc 140 is configured to be partially removed and alternately fully removed according to user selection. The selectively removeable disc 140 is hingedly connected to the base 128 when not fully removed. The plant pot 110 is reusable if the selectively removeable disc 140 has not been fully removed.

Figure 4:
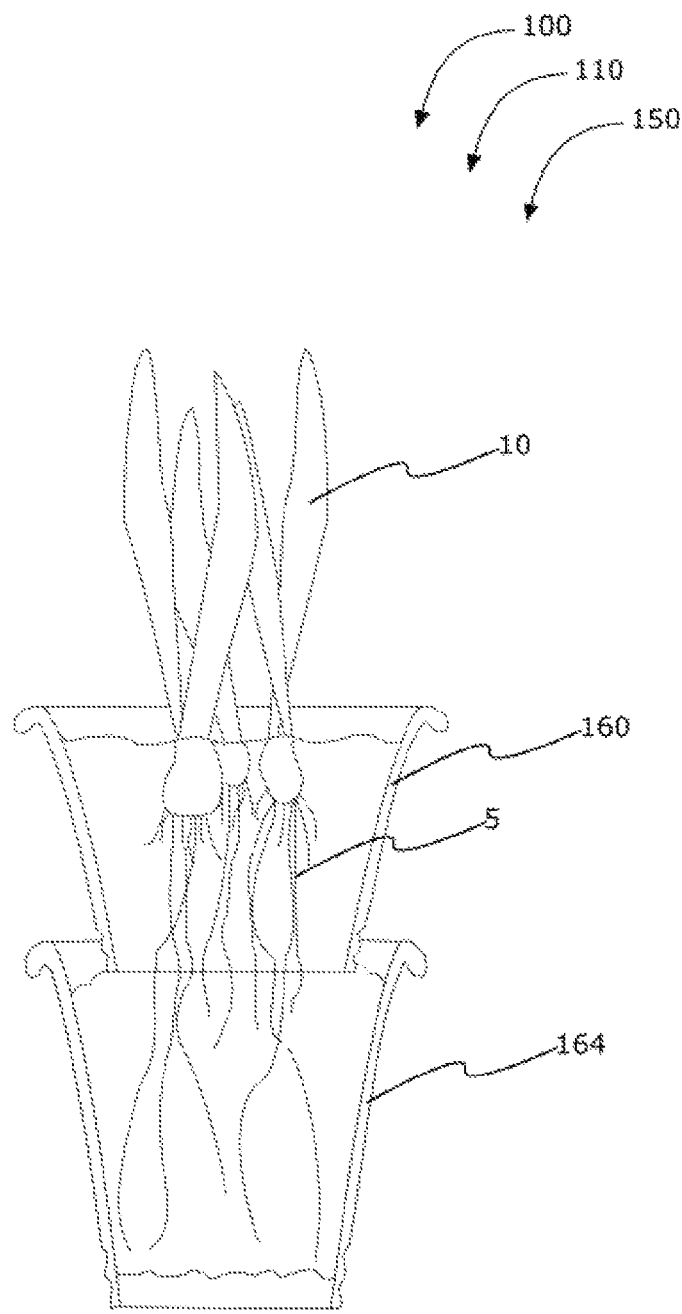
FIG. 4 is a side view of the stackable grow pot system of FIG. 1, according to an embodiment of the present disclosure.
Figure 5:
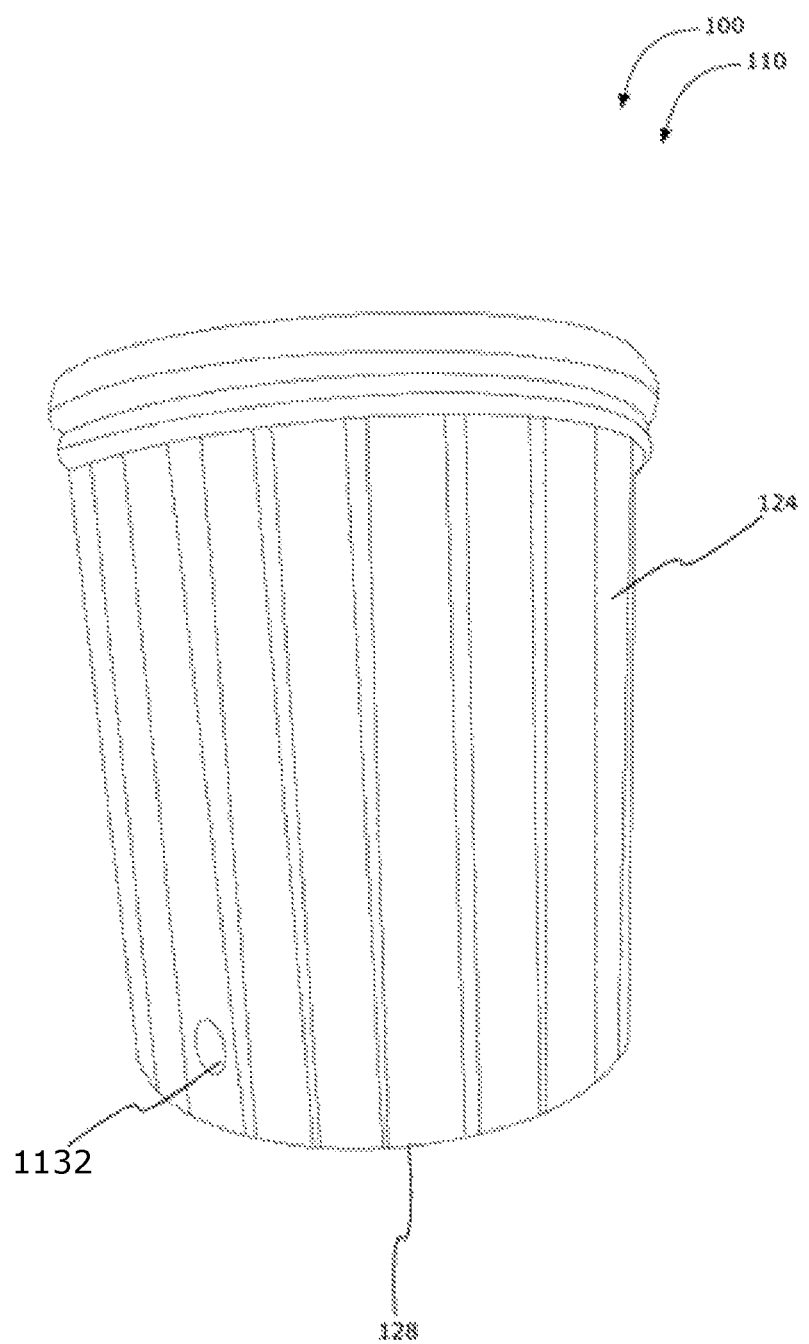
FIG. 5 is a side view of the stackable grow pot system of FIG. 1, according to an embodiment of the present disclosure.

FIGS. 4-5 show side views of the stackable grow pot system 100 of FIG. 1, according to an embodiment of the present disclosure. The plant pots are shown in a stacked condition in FIG. 4. The stackable grow pot system 100 may include the plant pot 110 and the removeable disc 140 configured to provide additional volume for plant growth when stacked on another plant pot 110. The plant pot 110 may be provided in a plurality of sizes/volumes to accommodate a relative size of the plant 10 growing within. The plant pots 110 may have a cylindrical profile or non-cylindrical profile. In a preferred embodiment, the plant pot 110 comprises a plastic material. The plant pot 110 includes at least one drainage hole 1132. A method of use may include the apparatus mentioned above and use of the removeable disc 140 and stacking as detailed herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A stackable grow pot system comprising:
   a plant pot having:
      an inner volume;
      a base including a selectively removeable disc that has the shape of a disc;
      and
      a plurality of side-walls;
   wherein said plant pot is defined by said base and said plurality of side-walls;
   wherein said selectively removeable disc is configured to be removed to allow plant roots to extend through an aperture;
   wherein said plant pot is stackable; and
   wherein when stacked, said plant pot provides for volume expansion for growth of a plant and said plant roots.

2. The stackable grow pot system of claim 1, wherein said selectively removeable disc is hingedly connected to said base.

3. The stackable grow pot system of claim 1, wherein said plant pot comprises a plurality of sizes to accommodate a relative size of said growing plant.

4. The stackable grow pot system of claim 1, wherein when said selectively removeable disc is removed, plant roots can extend from a first-plant-pot to a second-plant-pot.

5. The stackable grow pot system of claim 4, wherein said second-plant-pot is soil filled and configured to provide additional growth space from said growing plant.

6. The stackable grow pot system of claim 5, wherein said second-plant-pot is a transplant-receiving-pot.

7. The stackable grow pot system of claim 4, wherein said first-plant-pot and said second-plant-pot each comprise a top-diameter which is greater than a base-diameter of said base allowing the first-plant-pot to be stacked on said second-plant-pot.

8. The stackable grow pot system of claim 1, wherein said plant pot is structured to allow for transplanting of said plant growing within said plant pot without root damage.

9. The stackable grow pot system of claim 1, wherein said removable disc includes at least one drainage hole.

10. The stackable grow pot system of claim 1, wherein said selectively removeable disc is configured to be partially removed.

11. The stackable grow pot system of claim 1, wherein said plant pot is reusable.

12. The stackable grow pot system of claim 1, wherein said plant pot comprises a cylindrical profile.

13. The stackable grow pot system of claim 1, wherein said plant pot comprises a non-cylindrical profile.

14. The stackable grow pot system of claim 1, wherein said plant pot comprises a plastic material.

15. The stackable grow pot system of claim 1 wherein the base is the selectively removable disc.

16. The stackable grow pot system of claim 1 wherein the base is flat.

17. The stackable grow pot system of claim 1 wherein the disc is flat.

18. A stackable grow pot system, the stackable grow pot system comprising:
   a plant pot having:
      an inner volume;
      a base including a selectively removeable disc that has the shape of a disc;
      and
      a plurality of side-walls;
   wherein said plant pot is defined by said inner volume, said base, and said plurality of side-walls;
   wherein said selectively removeable disc is configured to be removed to allow plant roots to extend through an aperture;
   wherein said selectively removeable disc is hingedly connected to said base;
   wherein said selectively removeable disc is configured to be partially removed and alternately fully removed according to user selection;
   wherein said plant pot is stackable;
   wherein said plant pot comprises a cylindrical profile;
   wherein said plant pot comprises a plastic material;
   wherein when stacked, said plant pot provides for volume expansion for growth of a plant and said plant roots;
   wherein when said selectively removeable disc is removed, plant roots can extend from a first-plant-pot to a second-plant-pot;
   wherein said second-plant-pot is a soil filled said plant pot configured to provide additional growth space from said plant growing within said plant pot;
   wherein said second-plant-pot is a transplant-receiving-pot;
   wherein said first-plant-pot and said second-plant-pot each comprise a top-diameter which is greater than a base-diameter of said base allowing the first-plant-pot to be stacked on said second-plant-pot;
   wherein said plant pot is structured to allow for transplanting of said plant growing within said plant pot without root damage;
   wherein said removable disc includes at least one drainage hole.

* * * * *